United States Patent [19]

Onaga et al.

[11] Patent Number: 4,864,206
[45] Date of Patent: Sep. 5, 1989

[54] MULTIAXIS ROBOT CONTROL HAVING IMPROVED ENERGY MONITORING SYSTEM FOR PROTECTING ROBOTS AGAINST JOINT MOTOR OVERLOAD

[75] Inventors: Eimei M. Onaga, Brookfield Center; Richard J. Casler, Jr., Newton, both of Conn.

[73] Assignee: Westinghouse Electric Corp., Pittsburgh, Pa.

[21] Appl. No.: 180,598

[22] Filed: Apr. 6, 1988

Related U.S. Application Data

[63] Continuation of Ser. No. 932,973, Nov. 20, 1986, abandoned.

[51] Int. Cl.$^4$ .............................................. G05B 9/02
[52] U.S. Cl. ........................... 318/568.11; 318/568.16; 318/568.17; 901/23; 901/46; 364/513
[58] Field of Search ............... 318/334, 434, 471, 472, 318/563, 567, 568 R, 568 L, 570, 571, 572, 573, 574, 575, 576, 577, 615, 618, 634; 901/9, 19, 23, 14, 15, 46; 361/23, 24, 25, 30, 31; 364/513, 167.01, 188

[56] References Cited

U.S. PATENT DOCUMENTS

| | | | |
|---|---|---|---|
| 3,646,396 | 2/1972 | Fischer | 361/24 |
| 4,467,260 | 8/1984 | Mallick et al. | 318/434 X |
| 4,473,856 | 9/1984 | Takahashi et al. | 361/31 |
| 4,475,160 | 10/1984 | Inaba | 318/568 L |
| 4,523,135 | 6/1985 | Kogawa | 318/615 X |
| 4,524,313 | 6/1985 | Kuno et al. | 361/23 X |
| 4,529,921 | 7/1985 | Moribe | 318/567 X |
| 4,587,469 | 5/1986 | Ikebe et al. | 318/632 X |
| 4,604,561 | 8/1986 | Kamajima et al. | 318/567 |
| 4,611,682 | 9/1986 | Yasuda et al. | 361/24 X |
| 4,661,032 | 4/1987 | Arai | 318/568 X |
| 4,682,089 | 7/1987 | Tamari | 318/563 X |
| 4,714,865 | 12/1987 | Chin et al. | 318/563 |
| 4,718,078 | 1/1988 | Bleidorn et al. | 318/568 |

Primary Examiner—William M. Shoop, Jr.
Assistant Examiner—Paul Ip
Attorney, Agent, or Firm—J. L. Brzuszek

[57] ABSTRACT

A digital robot control includes a position/velocity microprocessor control and a torque microprocessor control for each of multiple robot axes. Digital position, velocity and motor current feedback signals are generated from motor sensor signals for use in making microprocessor control calculations. Another motor sensor generates an overlimit signal when motor temperature rises above a limit value to indicate excessive motor current. The torque microprocessor makes a backup motor energy calculation from the feedback motor current signal from each joint motor and compares the result to a stored motor energy limit. The robot is shut down if either limit is exceeded.

10 Claims, 12 Drawing Sheets

MULTIAXIS ROBOT CONTROL HAVING IMPROVED ENERGY MONITORING SYSTEM FOR PROTECTING ROBOTS AGAINST JOINT MOTOR OVERLOAD

This application is a, continuation, of application Ser. No. 06/932,973 filed Nov. 20, 1986 now abandoned.

CROSS REFERENCE TO RELATED APPLICATIONS

The following concurrently filed patent applications, each filed on Nov. 20, 1986, are related to the disclosure of the present application, assigned to the present assignee and are hereby incorporated by reference:

U.S. Ser. No. 932,975 (W. E. Case 53,224) now Continuation Ser. No. 180,719 filed Apr. 4, 1988 (W. E. Case 53,224C) entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841 (W. E. Case 53,225), now Continuation Ser. No. 231,627, filed Aug. 5, 1988 (W. E. Case 43,225C) entitled DIGITAL ROBOT CONTROL HAVING AN IMPROVED PULSE WIDTH MODULATOR and filed by Kenneth E. Daggett.

U.S. Ser. No. 932,992 (W. E. Case 53,226) now Continuation Ser. No. 180,703 filed Apr. 5, 1988 (W. E. Case 53,226C) entitled COMMUNICATION INTERFACE FOR MULTI-MICROPROCESSOR SERVO CONTROL IN A MULTI-AXIS ROBOT CONTROL SYSTEM and filed by Kenneth E. Daggett.

U.S. Pat. No. 4,763,055 (W. E. Case 53,227) entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,974 (W. E. Case 53,367), now Continuation Ser. No. 178,813 filed Apr. 1, 1988 (W. E. Case 53,367C) entitled DIGITAL ROBOT CONTROL PROVIDING PULSE WIDTH MODULATION FOR A BRUSHLESS DC DRIVE and filed by Kenneth E. Daggett, Richard A. Johnson, Eimei Onaga and Richard J. Casler.

U.S. Ser. No. 932,853 (W. E. Case 53,368), now Continuation Ser. No. 178,811 filed Apr. 1, 1988 (W. E. Case 53,368C) entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,982 (W. E. Case 53,369) entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 (W. E. Case 3,372) entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onaga and Richard J. Casler. (W. E. Case 53,373)

U.S. Pat. No. 4,786,847 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 (W. E. Case 53,374 entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977, now Continuation Ser. No. 180,601 filed Apr. 6, 1988 (W. E. Case 53,423C) entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990 (Wonagaase 53,424) now continuation Ser. No. 180,723 filed Mar. 4, 1988 (W. E. 53,424C) entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, Kenneth E. Daggett and Barrett Booth.

U.S. Pat. No. 4,829,219 (W. E. Case 53,489) entitled entitled MULTIAXIS ROBOT HAVING IMPROVED MOTION CONTROL THROUGH VARIABLE ACCELERATION/DECELERATION PROFILING and filed by Rajan Penkar.

U.S. Pat. No. 4,774,445 (W. E. Case 53,490) entitled MULTIAXIS ROBOT CONTROL HAVING CAPABILITY FOR EXECUTING TIMED MOVES and filed by Rajan Penkar.

U.S. Pat. No. 4,772,831 (W. E. Case 53,491) entitled MULTIAXIS ROBOT CONTROL HAVING IMPROVED CONTINUOUS PATH OPERATION and filed by Rajan Penkar.

U.S. Pat. No. 4,773,025 (W. E. Case 53,492) entitled MULTIAXIS ROBOT CONTROL HAVING FITTED CURVED PATH CONTROL and filed by Rajan Penkar.

U.S. Pat. No. 4,807,153 (W. E. 53,494) entitled MULTIAXIS DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robots and more particularly to robot controls and energy monitoring and protection systems for such controls.

In the operation of robots, any of a variety of conditions may cause one or more of the robot joint motors to become overloaded. When an overload occurs, it is desirable for personnel safety and property protection reasons to shut down the robot. Overload may occur, for example, as a result of a robot program error, a collision of the robot arm with an obstacle, a defect in a joint motor, etc.

Conventionally, motor monitoring systems operate from temperature sensors to determine when motor overload occurs and protective action needs to be initiated. Overload, i.e. excessive energization of a joint motor or drive electronics, is presumed to exist when motor overheating exists.

While the traditional motor monitoring systems provide a first level of motor overload protection, they do operate with some shortcomings. For example, there is some time delay between the time at which an overload condition arises and the temperature sensor based system responds to alarm the overload. Further, the system functions with limited accuracy in detecting the overload threshold. Finally, there is typically no backup monitoring means in the event of failure of the sensor system for any of the joint motors.

Accordingly, it is desirable that all joint motors in a robot be provided with backup monitoring protection coordinately with the primary temperature sensor based protection and that such backup protection provide fast and accurate energy monitoring.

The incorporated-reference patent applications are directed to a completely new digital robot control which has capability for relatively higher performance and with much greater functional sophistication. As such, the new digital robot control has facilitated meeting needs in the area of joint motor overload motoring and protection, and the present invention is directed to these aspects of the new digital control.

SUMMARY OF THE INVENTION

A digital control is provided for a robot having a plurality of arm joints. The control includes an electric motor for driving each of the robot arm joints, and a power amplifier operates to supply drive current to each motor.

Each joint motor has digital feedback control loop means operable at a predetermined sampling rate and including digital position and velocity control loops driving a digital torque control loop in accordance with digital position commands to generate digital motor voltage commands for controlling the associated power amplifier.

Means are provided for sensing the motion of each joint motor and for generating corresponding digital position and velocity feedback signals for control calculations in the position and velocity control loops.

In the feedback system, means are provided for generating digital signals representative of the respective joint motor drive currents for control calculations in the torque control loop. Means are also provided for sensing motor temperature and for generating an overtemperature signal when a predetermined motor temperature is exceeded indicating excessive motor current flow.

Backup energy monitoring means independently determine the energy applied to each joint motor from the motor current. The backup calculated energy for each joint motor is compared to a predetermined energy limit for that motor and an overlimit signal is generated when that limit is exceeded. The robot motor is deenergized when the overtemperature or overlimit signal is generated.

BRIEF DESCRIPTION OF THE DRAWINGS

FIGS. 7A1-A2 and 8 show respective block diagrams of the torque processor board and the arm interface board which are employed in implementing the invention;

DESCRIPTION OF THE PREFERRED EMBODIMENT

ROBOTS - GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics In Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subassembly anywhere within the sphere of influence and three additional motion axes are employed for universal orientation of the end effector. A driven system is used for each motion axis, and it may be electrical, hydraulic or pneumatic.

PUMA ROBOT

Figure 1:
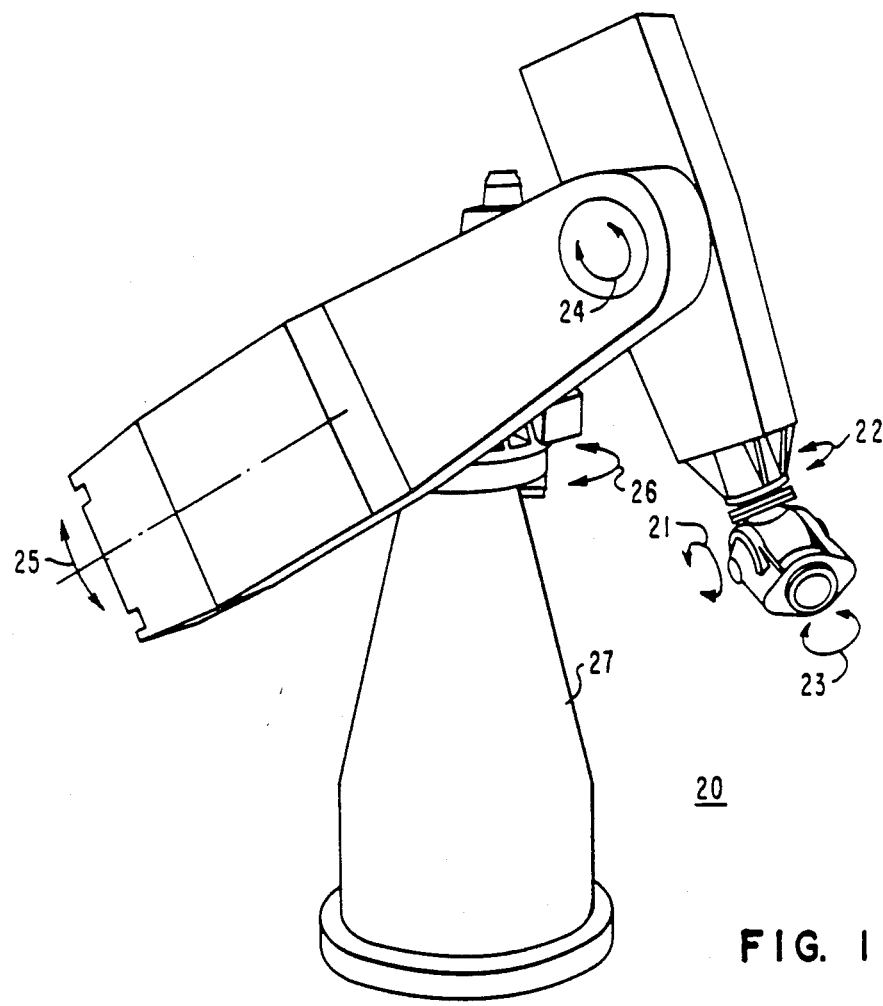
FIG. 1 shows a perspective view of a robot which is operated with more advanced and more accurate performance when controlled by a system making use of the invention.

More particularly, there is shown in FIG. 1 a six-axis industrial electric robot 20 which is illustrative of a wide variety of robots that can be operated in accordance with the principles of the invention. The robot 20 is a relatively powerful electric robot sold by Unimation Company, a wholly-owned company of the present assignee, under the trade name UNMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy minimal floor space, yet a large work envelope allows the robots to service multiple machines and work surfaces.

Each axis motion is generated by a brush type DC electric motor, with axis position feedback generated by incremental encoders. As shown, the wrist is provided with three articulations, i.e., an up/down rotation indicated by arrow 21 and a left/right rotation indicated by arrow 22 and a third motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIGS. 2, 3, or 4) which can operate the robot 20 of FIG. 1 and other robots including the larger Unimation 860 robot which employs brushless DC axis motors and absolute position feedback. Generally, however, the robot control 30 is universally and flexibly applicable to differing kinds and sizes of robots in stand alone or robotic network operation.

As a result of its universality, the control 30 can be arranged to operate a complete family of robots. Thus, all hydraulically and electrically driven robot arms manufactured by Unimation, a company of Westhouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo-control to provide better robot performance with lower cost.

CONTROL LOOPS

Figure 2:
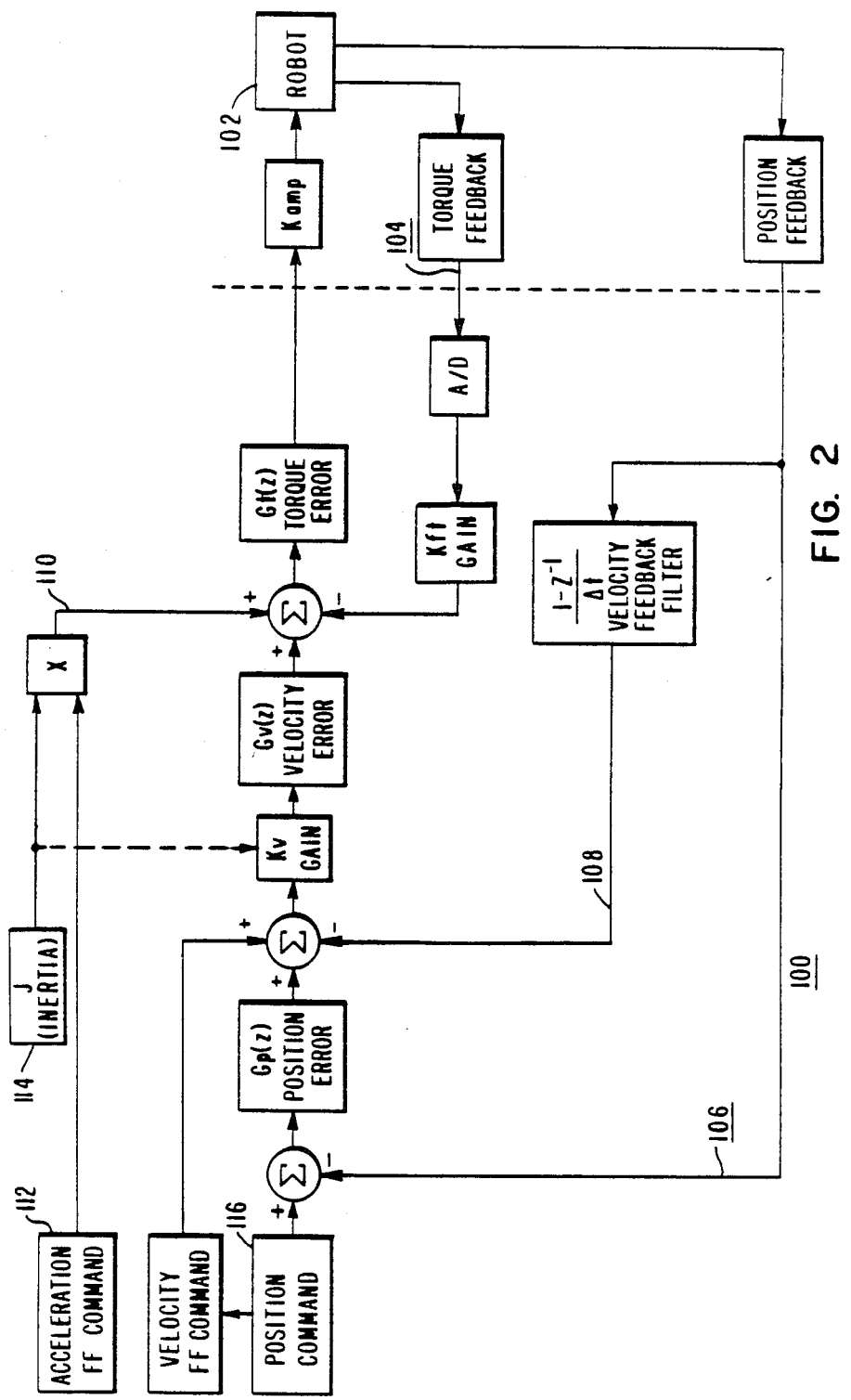
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL tm robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
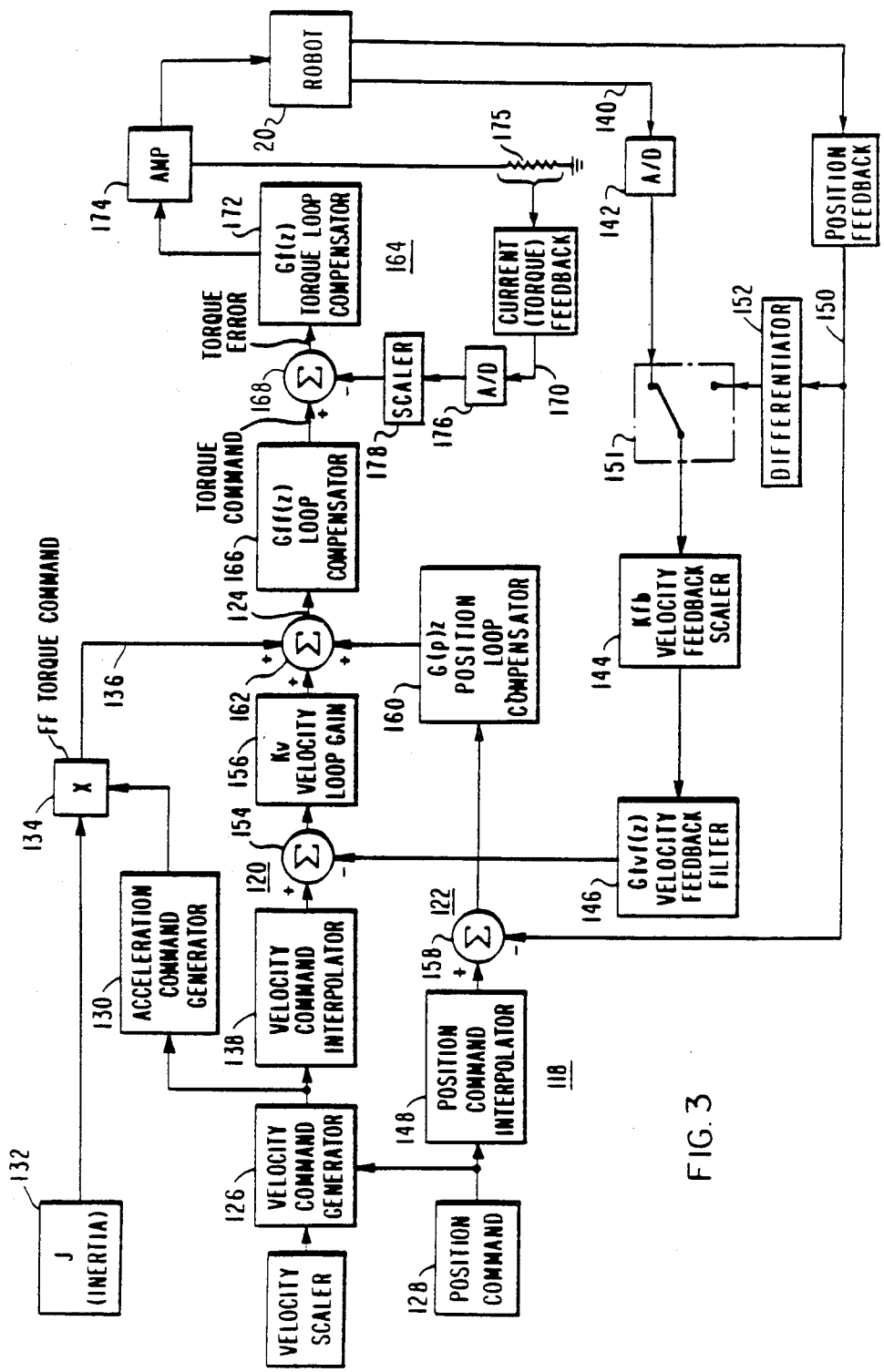
FIG. 3 shows a more detailed block diagram of a control loop arrangement employing position, velocity and torque control loops in which the invention preferably is embodied.

FIG. 3 shows the preferred generalized control loop configuration 118 presently employed in the UNIVAL Tm robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position control loop 122 and velocity control loop 120 are parallel fed to the input of a torque control loop 124. Velocities commands are generated by block 126 from position commands received by block 128. In turn, feedforward acceleration commands are generated by block 130 from the velocity commands. Computed inertia (load and arm) 132 is multiplied against the acceleration commands as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 126 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed form incremental position feedback as indicated by block 152 (with the switch 151 swinging to its other position) as described more fully in referenced applications W. E. 53,225 and W. E. 53,368.

Velocity error is generated by summer 154 with gain applied by loop 156. Similarly, position error is generated by summer 158 with gain applied by box 160.

Velocity and position errors and feedforward acceleration command are summed in summer 162. Gain is applied in box 166 to generate a torque command which is applied to the input of torque control loop 164 every millisecond. Torque error is generated in summer 168 by summing the torque command (motor current command0 with current feedback from feedback path 170. Box 172 applies a torque loop gain to the torque error (motor voltage commands) and pulse width modulated. (PWM) output signals are applied to a power amplifier 174 which supplies the motor drive current for robot joint operation. Current feedback from resistor 175 is generated every 250 microseconds (see referenced patent application W. E. 53,324) and converted to digital signals by box 176 with scaling applied by box 178.

OVERVIEW - ELECTRONIC BOARDS

Figure 4:
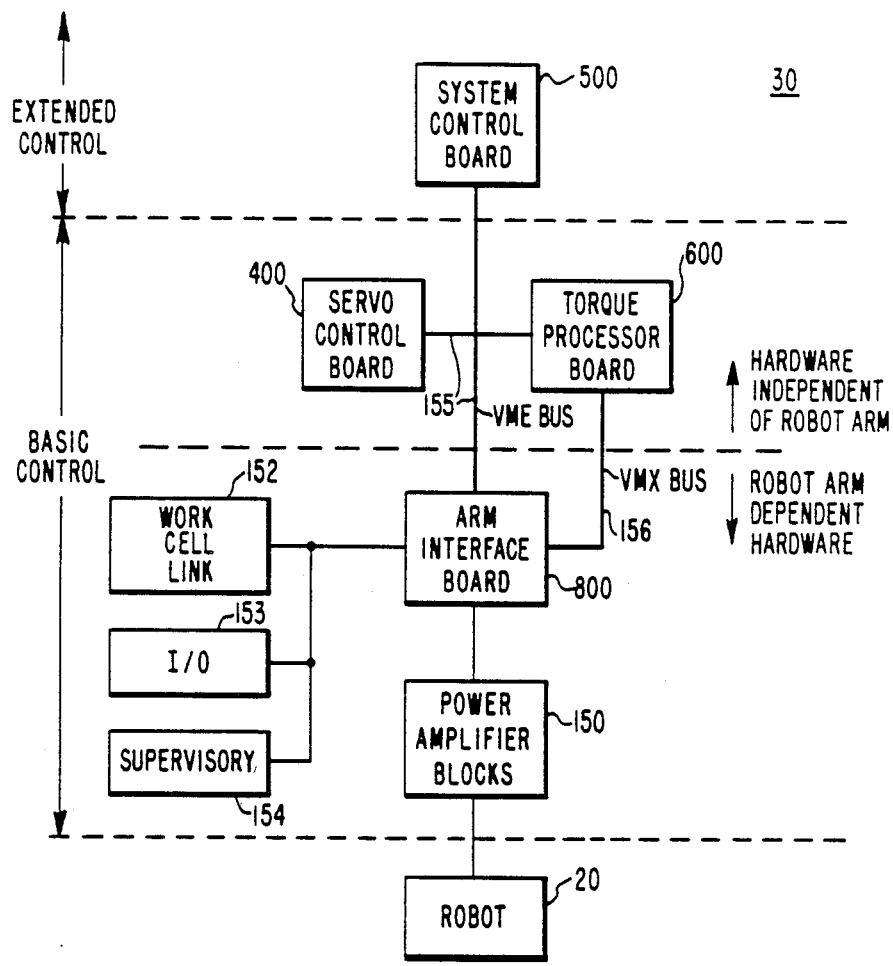
FIG. 4 shows an overview of an arrangement of electronic boards on which circuitry is arranged to implement the robot control and its energy monitoring system in accordance with the present invention.

Implementation of the control looping for the robot control 30 in FIG. 4 is achieved by the use of digital control circuitry disposed on a plurality of electronic boards. The organization of the circuitry on the boards and the partitioning of programming among various microprocessors (1) enables advanced robot control performance to be achieved with a modular control configuration characterized with economy of manufacture and (2) facilitates variability of configuration which enables universality of use and flexibility in choice of level of control performance.

As shown in FIG. 4, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in Figure 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

SYSTEM FOR MONITORING AND PROTECTING ROBOT AGAINST JOINT MOTOR OVERLOAD

Figure 5:
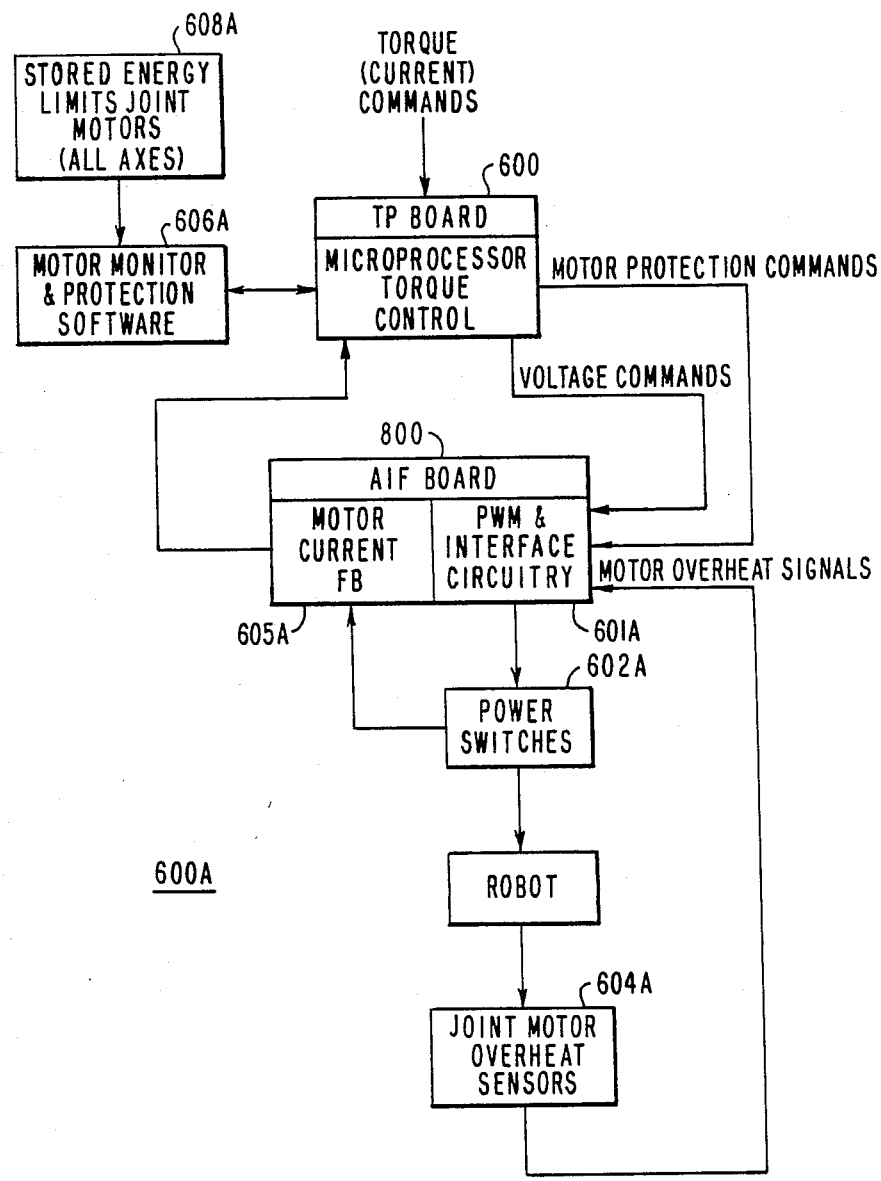
FIG. 5 shows a block diagram of a joint, motor energy monitoring and protection system employed in the robot control of FIG. 4 in accordance with the invention.

There is shown in FIG. 5 a system 600A for monitoring and protecting the robot against joint motor overloading or overheating in accordance with the invention. The torque processor (TP) board 600 provides for each robot axis a torque control loop that responds to motor torque (current) commands to generate voltage commands for a pulse width modulator (PWM) 601A on the arm interface (AIF) board 800.

The PWM generates digital signals for operating power switches 602A that control the application of voltage across the joint motor windings (in this case, either DC brush type or DC brushless type motor windings) for the various robot axes. The resultant energization of the various joint motors normally satisfies the input torque commands which are derived from a higher level robot program.

As already indicated, however, various conditions may cause the actual current(s) flowing through the windings of one or more joint motors to exceed motor energization limits. The robot arm, for example, may encounter an obstacle which causes an overload condition.

When excessive current flows through a joint motor winding, a conventional motor temperature sensor 604A will in a short time become heated to the point where it generates a protection signal that is applied to the AIF board 800 where it is processed to drive the PWM outputs to zero thereby shutting down the robot.

To provide backup protection and/or faster and more accurate sensing of joint motor overheating, motor monitor and protection software 606A is executed in microprocessors on the TP board 600. The monitor software 606A employs actual motor current feedback signals 605A to compute the energy applied to each joint motor over a predetermined computation cycle time period.

The software 606A next compares the computed results with stored motor energization limits 608A. If any limit is exceeded, protection commands are microprocessor generated on the TP board 600 and applied to the PWM on the AIF board 800 to shut down the robot independently of any action that may or may not be about to be taken by one or more of the motor temperature sensors 604A.

Figure 6:
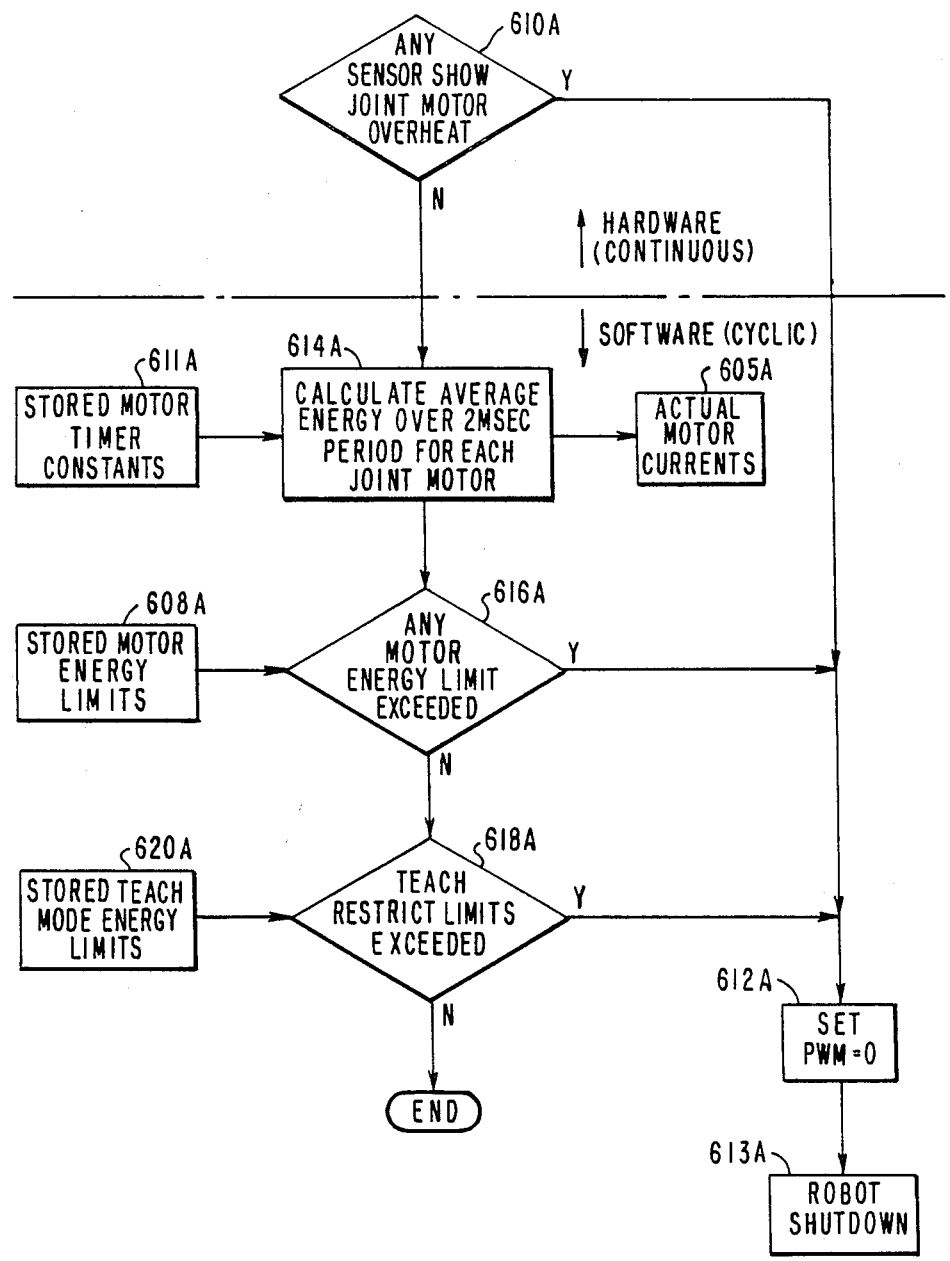
FIG. 6 shows a logic diagram indicating the manner in which the joint motor monitor and protection system operates.
Figures 1, 7A:
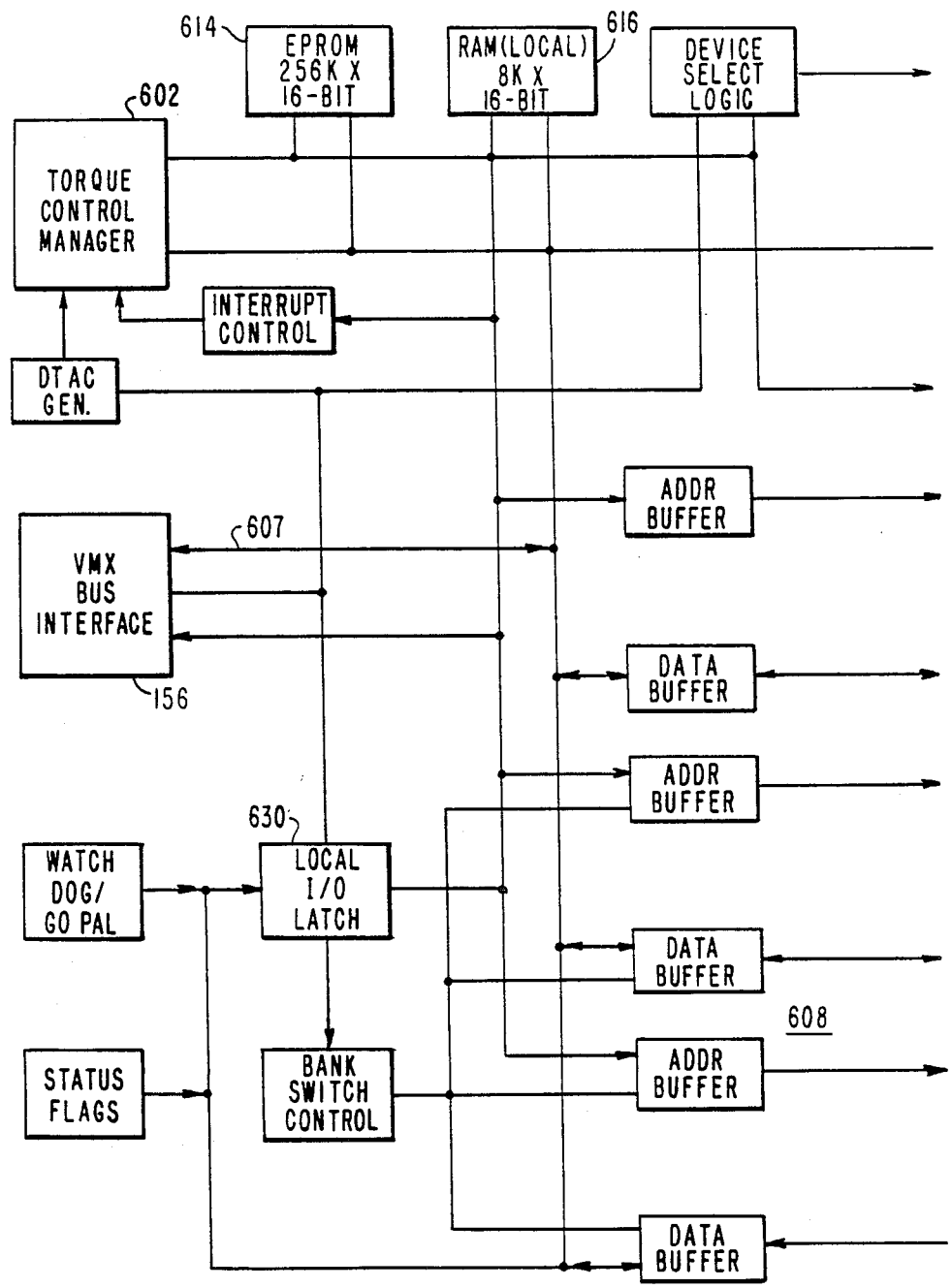
Figures 2, 7A:
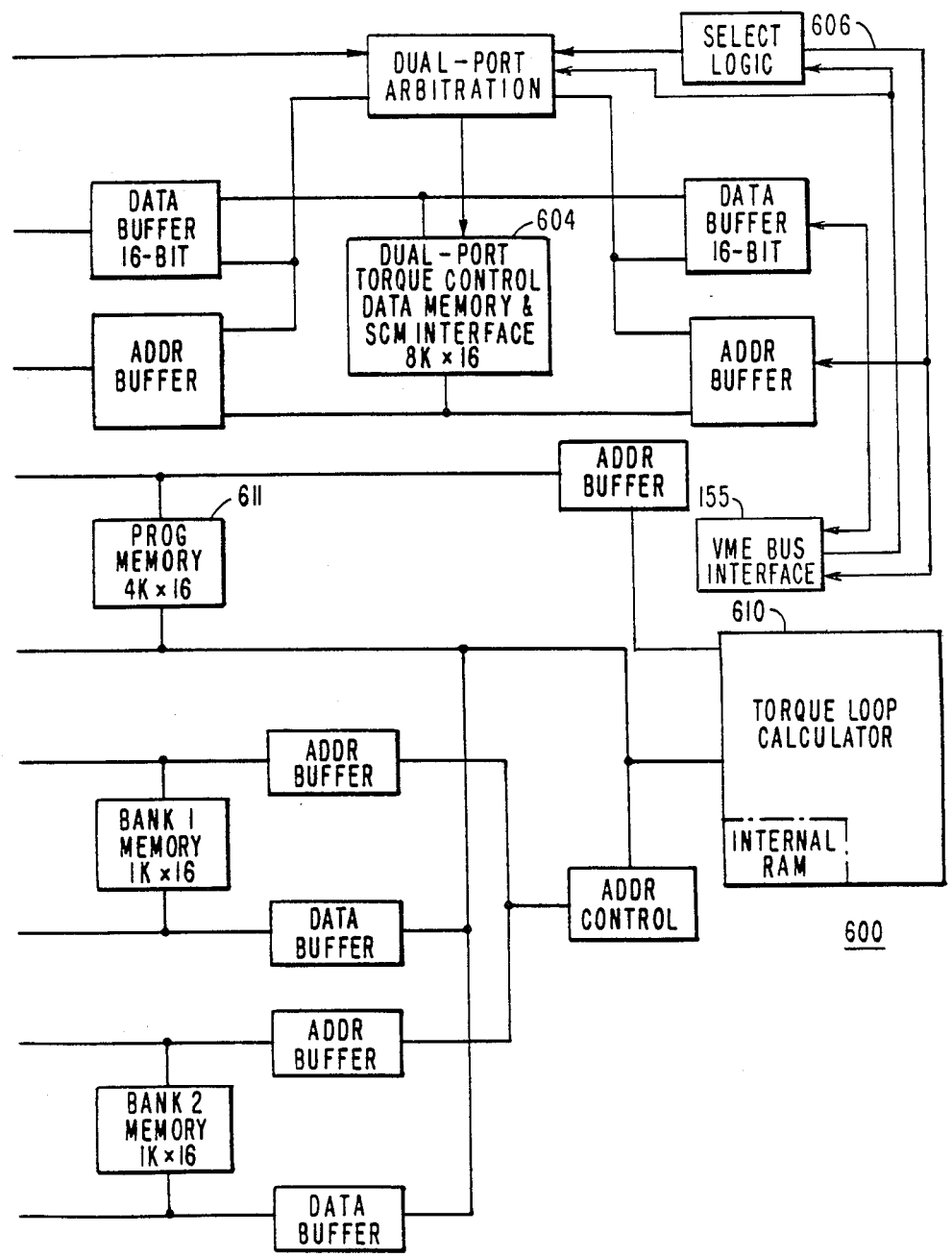
Figure 8:
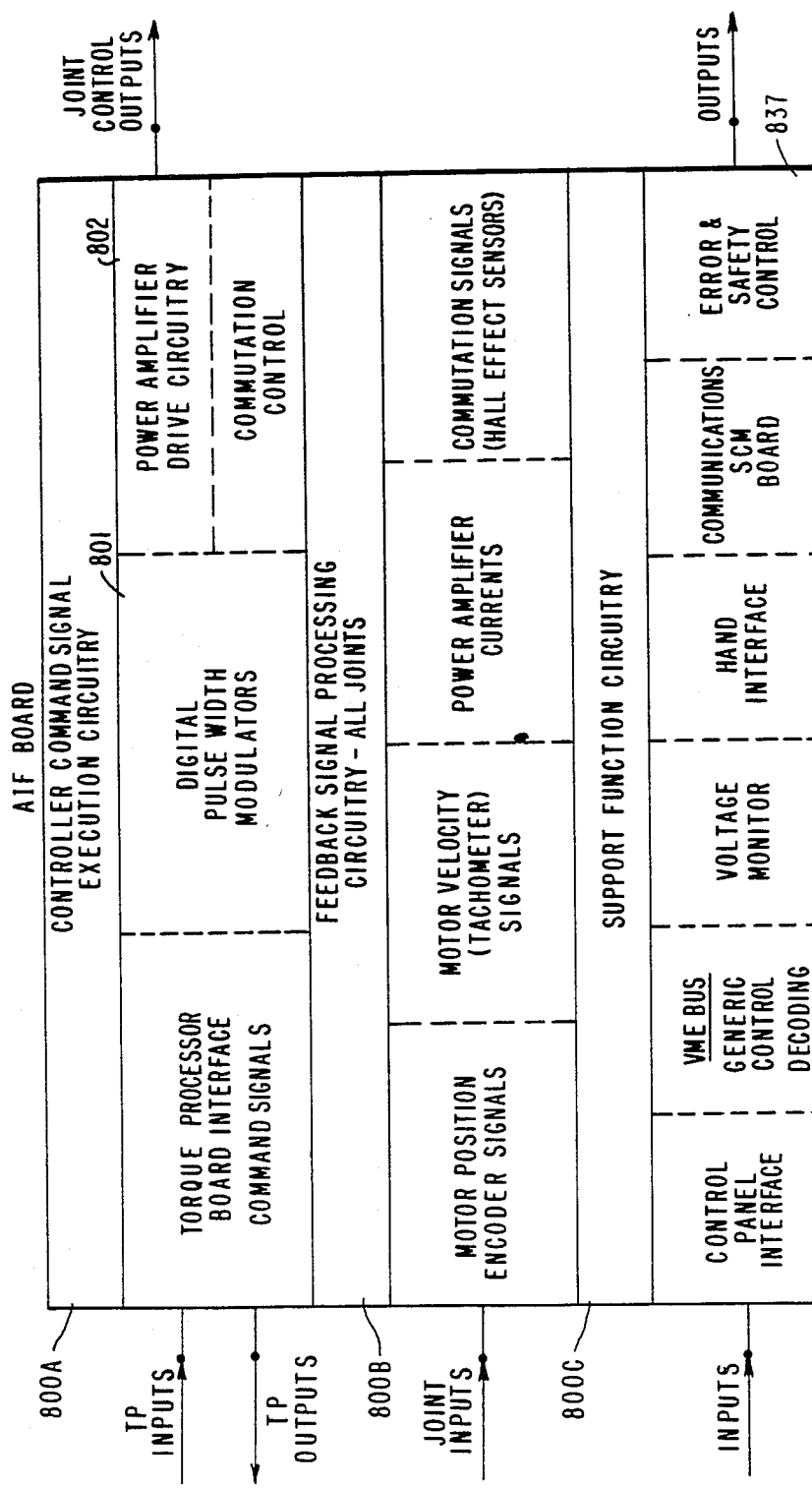

The logic associated with operation of the monitor and protection system is shown in FIG. 6. Box 610A detects whether the physical sensors indicate any of the joint motors is overheating. If so, block 612A sets PWM to zero and the robot is shut down as indicated by box 613A.

If no overheating is physically sensed or if overheating is present but not physically signaled, a backup logic path includes block 614A that calculates for each joint motor the average applied energy over each of successive two millisecond time periods. Block 616A compares the computed applied energy for each motor to the known energy limit based on motor capability (as specified for example by the manufacturer) for that motor which is stored for call-up as indicated by the block 608A.

If any joint motor energy limit is exceeded, block 612A shuts down the robot. If no motor energy limit is exceeded, block 618A next determines whether any special lower motor energy limit(s) have been exceeded, i.e., whether lower motor energy limits 620A applicable to the teach mode of robot operation have been exceeded. If so, the robot is shut down through the block 612A as previously described. If not, the monitor software execution is ended until it is repeated in the next cycle.

In making the motor energy calculation, the actual feedback current sample 605A for each motor is squared to produce a scalar proportional to the applied electrical power. To average the feedback current for each motor for a predetermined time period undergoing measurement, the power scalar is processed through a digital filter having a time constant 611A corresponding to the particular motor for which the calculation is being made. The filter output is the quantity that is compared to the stored motor energy limit.

The following algorithm is employed to provide motor energy checking as described:

Energy Check Algorithm

The energy check calculates motor energy and alarms the SCM when energy exceeds a specified limit for a specified period of time.

(1) Input
    current       CUR1    1 msec averaged current
    energy limit  ELIMIT  from SMB Board (constant)
    time constant TAU     from SMB Board (constant)
    Output:
    alarm         ECODE   to SCM Board (2) Principle:

$$i \longrightarrow \boxed{\times \frac{i*i}{\phantom{x}}} \longrightarrow 1/(1+as) \xrightarrow{\text{Energy}} \text{Threshold} \longrightarrow \text{Alarm}$$
$$\text{1st order filter}$$

i = current [A]

(3) Algorithm:
    temp = CUR1**2 − ENERGY
    ZOENGY = ZOENGY + temp
    ENERGY = ZOENGY / 2**16 * TAU
    if |ENERGY| > ELIMIT
        then ENCODE = OVENGY (4) SCALING:
    (i) condition of alarm output
    ‾ is step input of i**2 = k*limit is applied, then
    - output an alarm condition tx seconds after step is applied.
    (ii) equation
        a = delt * 2**16/TAU
        TAU = delt * 2**16/a
            = about 20 to 40 for delt = 4 msec

FURTHER DESCRIPTION OF BOARD IMPLEMENTATION CIRCUITRY TORQUE PROCESSOR BOARD CONCEPTS

The torque processor (TP) board 600 provides a functional interface to the robot joint drive motors. Functionally, the TP board 600 implements the lowest level of control in the hierarchical control system, providing closed loop servo torque control for six robot axes. Physically, the TP board 600 electrically interfaces the robot path planning control system and the servo control (SCM) board with the arm interface (AIF) board 800, which in turn interfaces to the robot joint drive motors. The primary function of the TP board 600 is to regulate robot joint motor currents to commanded values by generating motor winding voltage commands which are executed using a pulse width modulation scheme on the AIF board.

The TP board 600 interfaces at one level to the SCM board, accepts from the SCM board torque commands and servo parameters for six axes and returns status data. The TP board 600 interfaces at a second lower level to the AIF board 800 providing servo voltage commands for the six robot axes. The AIF board 800 receives drive motor current, position and velocity feedback for closed loop control on the SCM and TP boards.

The TP board 600 employs the paired microprocessor to provide a number of features including the following:

| | |
|---|---|
| 1. | Torque loop control for six axes (250 micro sec per 6 axes) for brush and brushless motors; |
| 2. | Software adjustable current offset - eliminates potentiometers; |
| 3. | Downloadable gains - arm dependent parameters can be downloaded from the SCM board; |
| 4. | PWM compensation; |
| 5. | Commutation compensation; |
| 6. | Current averaging for data logging and other purposes; |
| 7. | Current limit check for safety; |
| 8. | Velocity monitoring (back emf) for safety check; |
| 9. | Energy check (IIT) to test stall condition; |
| 10. | Power-up self diagnostics; and |
| 11. | Downloadable diagnostics system. |

TORQUE PROCESSOR BOARD

More advanced robot performance is produced by digitally controlling the torque applied at the arm workpoint when the arm is in motion to control the arm workpoint position in accordance with a command trajectory. Axis drive forces are adjusted in accordance with actually experienced workpiece loading to satisfy position and trajectory commands with greater speed, accuracy and efficiency. Reference is made to W. E. 53,423 for a related invention directed to the control of torque as an end controlled variable.

The torque control is embodied on a generic control circuit board 600 (FIGS. 4, 6 and 7A-1, 7A-2) called a torque processor (TP) board i.e., an electronic board usable to provide torque control for a wide variety of robots having different load capacities, different types of drives, different numbers of axes, etc.

The torque processor board 600 employs digital circuitry to generate voltage commands for each joint motor or axis drive on the basis of torque commands obtained from a higher control level (SCM board) and feedback currents obtained through the arm interface (AIF) board 800 from the axis drives. Thus, the torque control loops for all of the joint motors are closed through the TP board circuitry.

In the case of electric drives, the feedback current is the motor winding current which is proportional to actual motor torque. For hydraulic drives, the feedback current is also proportional to actual motor torque.

The digital torque control circuitry is preferably structured with multiple digital processors so that needed control computation and control support functions can be achieved for all axes accurately and efficiently within sampling frequency requirements.

In particular, a torque control manage 602 interfaces with a dual port SCM interface memory 604 for the exchange of stored torque control data between the SCM (servo control module) and the TP (torque processor) control levels. Axis torque commands and control loop parameters are downloaded from the SCM to the TP interface memory 604 through a data bus 606 preferably of the VME type. In return, status data is uploaded to the servo control level (SCM). The interface 604 between the TP and SCM boards is a dual port shared memory which serves as a slave to the VME bus 606. Other board memories include a ping-pong memory 608, program EPROM 614, local RAM 616, and TP calculator memory 611 in FIG. 7A-2.

The torque control manage 602 also directs the flow of current feedback from circuitry on the AIF board 800 at the next lower control level to the torque processor board 600 for torque control loop operation. Drive voltage commands resulting from torque control calculations are directed to the arm interface (AIF) board 800 by the torque control manager 602. The ping-pong (bank switched) memory 608 operates under the control of handshake flags to store command, feedback, and status data so that it is available when needed for torque control calculations or for higher control level reporting requirements or for axis drive control.

A coprocessor 610 provided in the form of a digital signal processor operates as a torque loop calculator which receives torque commands and feedback currents from the torque control manager 602 through the ping-pong memory 608, calculates drive voltage commands for the various robot axes from the torque errors computed from the torque commands and feedback currents, and transfers the drive voltage commands through the ping-pong memory 608 to the arm interface circuitry on command from the torque control manager 602.

With the described digital circuit structure, all needed torque control functions are able to be performed rapidly (250 microsecond sampling rate or better) and accurately within frequency bandwidth requirements. Specifically, the rapid calculating capability of the digital signal processor 610 is employed for the torque control calculations as the data organizing and directing capability of the torque control manager 602 is employed for most other functions thereby enabling highly improved control performance to be achieved efficiently and economically.

The torque control manage 602 has an architecture well suited for the tasks described for data management but which has a calculating speed (i.e., over 4 microseconds for a 16×16 bit multiplication) too limited to meet torque control bandwidth requirements. The digital signal processor 610 has an architecture set for Z transform calculations (i.e., a calculating speed of 200 nanoseconds for a 16×16 bit multiplication) but which is otherwise generally unsuitable for the kinds of tasks assigned to the data manager processor 602. These two microprocessors function together as a unit or, in other terms, as a servo engine.

For more detail on the torque board circuitry, reference is made to W. E. 53,423 or W. E. 53,226.

TORQUE CONTROL PROGRAMMING

The torque processor board 600 is operated under the control of programs executed in the on board processors 602 and 610 to implement torque command signals from the high SCM control level.

The torque processor software generally performs the following tasks which are partitioned as indicated:

Torque Control Manager 602

Communication wit SCM
Command handling
Current sampling, conversation and offset adjustment
Commutation switch flag (state reading)
Ping-pong memory management
PWM chip management
Diagnostics
Error reporting

Torque Loop Calculator 610

(program cycling based on 250 microsecond interrupt)

Overcurrent check—absolute and average
Torque loop calculations
Current averaging
PWM compensation
Commutation compensation
Back emf check—monitors velocity for safety
Energy check—tests for stall conditions Reference is made to W. E. 53,227 for more detail on TP software structure and operation.

ARM DRIVE CONTROL

As previously described, the higher level control looping generates voltage command signals to be executed through the AIF board 800 for the arm axes so that the arm effector is moved to commanded positions under controlled velocity, acceleration and torque in accordance with a user's robot or application program. Pulse width modulation circuitry 801 and drive circuitry 802 are provided on the AIF board 800 to develop axis drive signals, in this instance for application to power amplifiers which provide the drive currents to DC brushless electric motors respectively associated with the six axes of arm motion.

The AIF board circuitry processes the voltage command data to develop digital TTL logic level signals to control the base or gate drive circuitry of the power amplifiers which supply the motor drive currents to the axis motors. As previously indicated, the motor currents and axis position and velocity data are fed back through the AIF board 800 to the higher level control loops for closed loop position, velocity and torque control.

AIF BOARD—PULSE WIDTH MODULATION SCHEME

The pulse width modulation circuitry 801 on the AIF board 800 provides a digital interface for closing the torque or current control loop through the axis motor drive circuitry. The pulse width the modulation concept is applied to control the conduction time width form the joint motor power switches and thereby satisfying motor voltage and torque commands.

Figure 9:
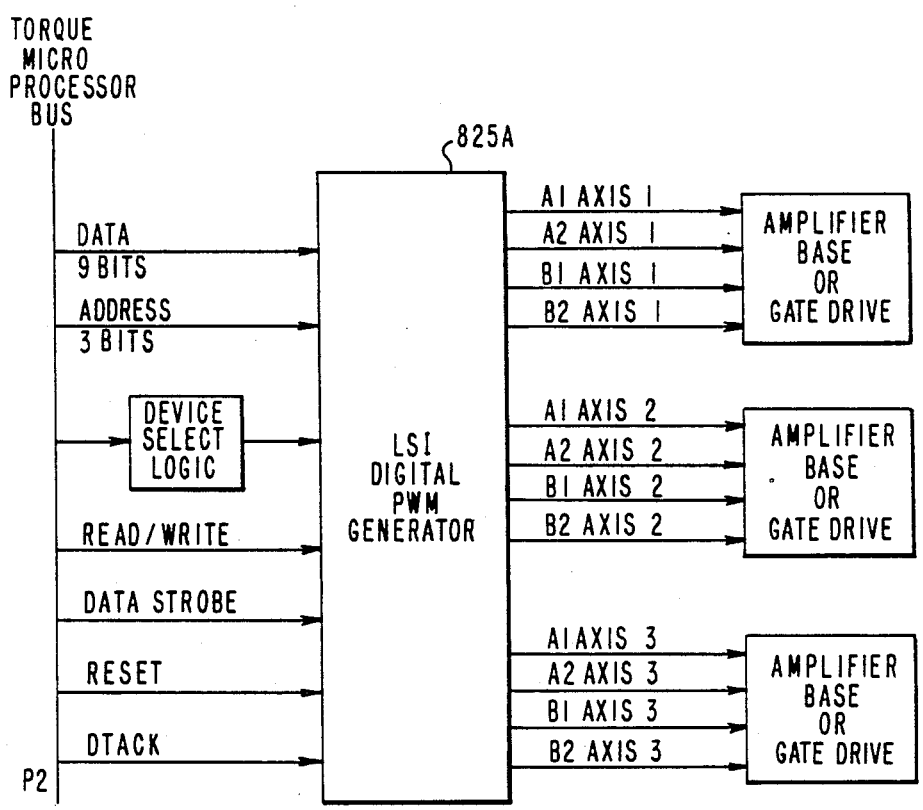
FIG. 9 shows a block diagram of a PWM circuit used on the AIF board to generate joint motor control signals.

As shown in the generalized block diagram of FIG. 9, a digital PWM generator 825A receives 9 bit data commands and 3 register address bits on the torque microprocessor P2 bus (not specifically shown). Additionally, device select logic, read/write, reset (initialization) and data strobe signals are received from the P2 bus. A DTACK (acknowledge) signal is returned to the bus by the PWM generator 825A after each reception from the torque calculator on the torque processor board.

The digital PWM generator 825A is preferably arranged to service three axes where, for example, either brushless or brush type DC motors are employed as the axis drives. Thus, a set of digital signals (in this instance four such signals A1, A2, B1, B2) is generated for controlling the each axis motor whether the motor is the brushless type or the DC brush type.

Figure 10A:
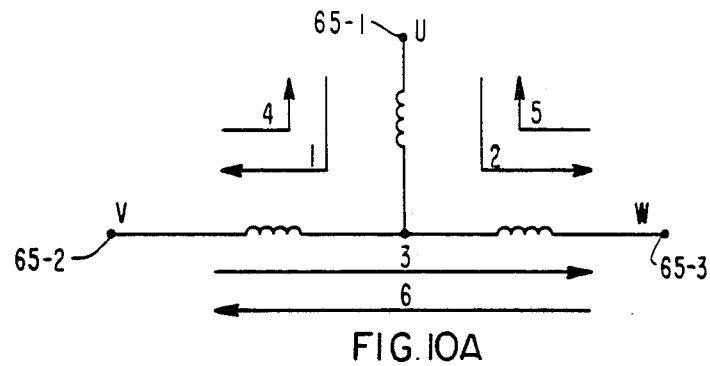
FIGS. 10A, 10B and 11 show bridge circuit configuration for DC brushless and brush type joint motor windings.
Figure 10B:
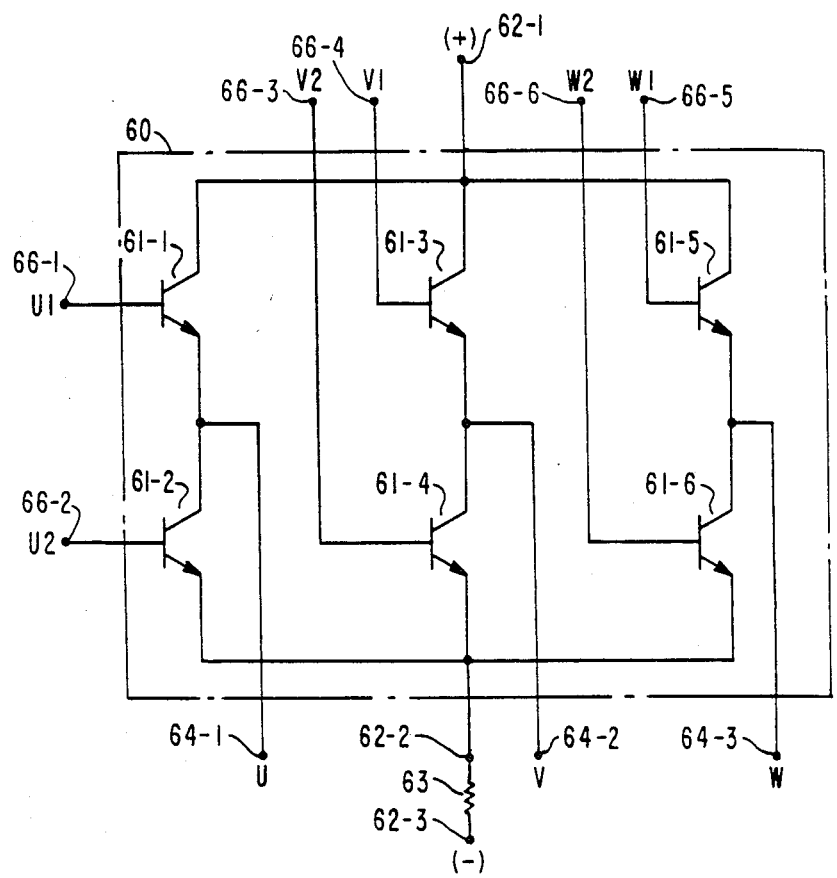

Four digital PWM control signals are employed to control the direction and magnitude of current flow through the motor windings through on/off power switch control. In the brushless DC motor embodiment, the three phase windings of the brushless DC motor are interconnected in a bridge circuit (FIG. 10A-B) such that the motor drive current is always directed through a selected pair of windings and the motor conduction path is rotated or commutated through successive winding pairs to produce the motor drive torque. In this arrangement, the PWM pulses determine the time span of motor current flow, and commutation switching logic based on the PWM pulses and Hall effect sensor feedback signals determine the winding pairs through which, and the direction in which, drive current is to flow.

Figure 11:
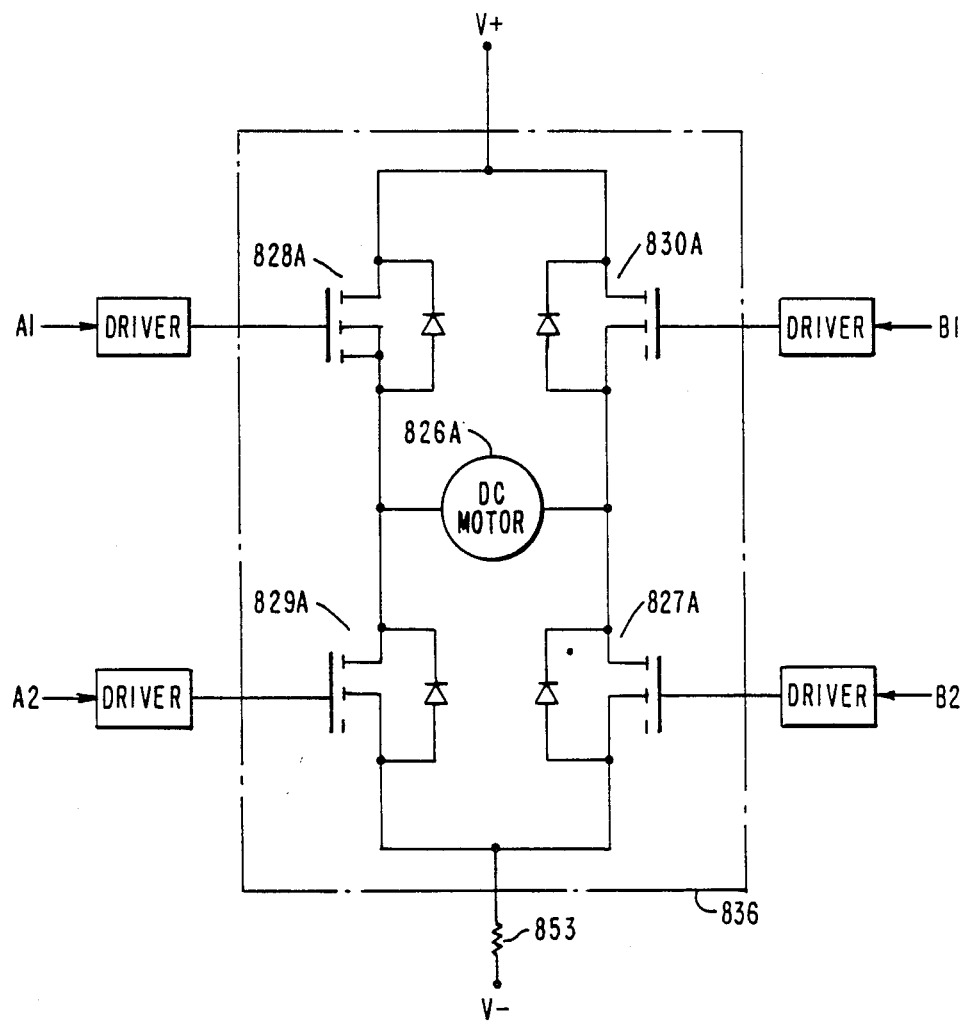

In the DC brush type embodiment where an H type power amplifier bridge circuit is employed, DC brush type motor 826A (FIG. 11) is operated in one direction when power amplifier switches 827A and 828A are conducting under control of PWM output driver signals A1 and B2, and it is operated in the opposite direction when power amplifier switches 829A and 830A are conducting under control of PWM output driver signals B1 and A2.

The pulse width modulation circuitry is preferably embodied in a pair of large scale integrated pulse width modulation (PWM) chips. Generally, each PWm chip operates as a microprocessor peripheral device (i.e., under the control of a microprocessor higher in the control loop configuration) to provide digital pulse width modulated signal generation for control of three axes having DC brush type motor drives.

For more detail on motor current, position and velocity feedback and other AIF board circuitry reference is made to W. E. 53,569. For more detail on the PWM scheme reference is made to W. E. 53,225.

What is claimed is:

1. A digital control for a robot having a plurality of arm joints, said control comprising:
    an electric motor constituting a joint motor for driving each of the robot arm joints;
    a power amplifier operable to supply drive current to each joint motor;
    each joint motor having digital feedback control loop means operable at a predetermined sampling rate and including digital position and velocity control loops driving a digital torque control loop in accordance with digital position commands to generate digital motor voltage commands for controlling the associated power amplifier;
    means for sensing the motion of the each joint motor and for generating corresponding digital position and velocity feedback signals for control calculations in said position and velocity control loops;
    means for generating digital signals representative of the respective joint motor drive currents for control calculations in said torque control loop;
    means for sensing motor temperature and for generating an overtemperature signal when a predetermined motor temperature is exceeded indicating excessive motor current flow;
    energy monitoring and evaluating means independently determining the energy applied to each joint motor from the historical digital representation of motor current;
    means for comparing the calculated energy for each joint motor to a predetermined energy limit for that motor and for generating an overlimit signal when that limit is exceeded; and
    means for shutting down robot motor energization when said overtemperature or overlimit signal is generated.

2. A digital robot control as sets forth in claim 1 wherein the motor torque energy limit is based on motor capability.

3. A digital robot control as set forth in claim 1 wherein the motor torque energy limit is less than the motor capability limit and is based on a predetermined use condition.

4. A digital robot control as set forth in claim 3 wherein the predetermined use condition is based upon operating limitations specified for motor operation.

5. A digital robot control as set forth in claim 1 wherein said energy monitoring and evaluating means generates a scalar proportional to the electrical power from the squared value of each current feedback sample, averages the power scalar values over a predetermined time period, and filters the averaged scalar to generate as an output said calculated energy for each motor.

6. A digital robot control as set forth in claim 1 wherein the following algorithm is employed in the energy calculation:

| Algorithm: | |
| --- | --- |
| temp | = CURI**2 − ENERGY |
| ZOENGY | = ZOENGY + temp |
| ENERGY | = ZOENGY / 2**16 *TAU |
| if \|ENERGY\| > ELIMIT | |
| then ECODE = OVENGY. | |

7. A digital robot control as set forth in claim 1 wherein each of said motor torque control loops includes torque servo control means having microprocessor means for generating motor voltage commands from torque commands and motor current feedback signals;
    another servo control means having another microprocessor means included in each of said motor velocity control loops and generating torque commands in response to position and velocity commands and position and velocity feedback signals; and
    said torque microprocessor means including said energy monitoring means and said comparing means.

8. A robot comprising:
    an arm having a plurality of joints;
    an electric motor for driving each of the robot arm joints;
    a power amplifier operable to supply drive current to each motor;
    each motor having digital feedback control loop means operable at a predetermined sampling rate and including digital position and velocity control loops driving a digital torque control loop in accordance with digital position commands to generate digital motor voltage commands for controlling the associated power amplifier;
    means for sensing the motion of each motor and for generating corresponding digital position and velocity feedback signals for control calculations in said position and velocity control loops;
    means for generating digital signals representative of the respective motor drive currents for control calculations in said torque control loop;
    means for sensing motor temperature and for generating an overtemperature signal when a predetermined motor temperature is exceeded indicating excessive motor current flow;

energy monitoring means, determining independently of the sampling rate, the energy applied to each motor from the digital representation of motor current;

means for comparing the calculated energy for each motor to a predetermined energy limit for that motor and for generating an overlimit signal when that limit is exceeded; and means for shutting down robot motor energization when said overtemperature or overlimit signal is generated.

9. A robot as set forth in claim 8 wherein said energy monitoring means generates a scalar proportional to the electrical power from the squared value of each current feedback sample, averages the power scalar values over a predetermined time period, and filters the averaged scalar to generate as an output said calculated energy for each motor.

10. A robot as set forth in claim 8 wherein each of said motor torque control loops includes torque servo control means having microprocessor means for generating motor voltage commands from torque commands and motor current feedback signals;

another servo control means having another microprocessor means included in each of said motor velocity control loops and generating torque commands in response to position and velocity commands and position and velocity feedback signals; and said torque microprocessor means including said energy monitoring means and said comparing means.

* * * * *